Dec. 23, 1958 P. BAKKER 2,866,006

TRAFFIC SUPERVISORY CONTROL CIRCUITS

Filed Feb. 15, 1954 2 Sheets-Sheet 1

INVENTOR.
PIER BAKKER

BY [signature]

ATTY.

Dec. 23, 1958 P. BAKKER 2,866,006

TRAFFIC SUPERVISORY CONTROL CIRCUITS

Filed Feb. 15, 1954 2 Sheets-Sheet 2

INVENTOR.
PIER BAKKER
BY Wm. Watts Owen
ATTY.

United States Patent Office 2,866,006

Patented Dec. 23, 1958

2,866,006

TRAFFIC SUPERVISORY CONTROL CIRCUITS

Pier Bakker, Chicago, Ill., assignor to General Telephone Laboratories, Incorporated, a corporation of Delaware Application February 15, 1954, Serial No. 410,347

8 Claims. (Cl. 179—27)

This invention relates to telephone systems and more particularly to supervisory circuits for use therein.

Soon after the introduction of the telephone came the initial steps in the development of automatic switching equipment, whereby it became possible for subscribers in a local area, served by the same exchange, to call each other without the assistance of an operator. As the advantages in speed of completing connections and in economy became apparent, the use of dial controlled, automatic switching equipment became widespread. Continuous improvement in automatic equipment resulted eventually in equipment failures giving rise to fewer wrong connections than might be expected as a result of human error in manually operated exchanges.

However, prior to the introduction of the fully automatic, unattended small exchange, it was necessary to have one or more operators available even in the small automatic exchanges, not too distant from each other, for extending connections between local subscribers and subscribers in other exchanges, whether the latter exchanges provided dial or manual service for its local subscribers. It was apparent that said operators required dial equipment at their positions in order to extend a call from a distant exchange to one of their local subscribers.

Subsequently provision was made for enabling an operator in one exchange to automatically complete connections to subscribers in nearby automatic exchanges without help from an operator at the nearby exchange; and, in some automatic exchanges, equipment was provided for enabling local subscribers to dial through to subscribers in nearby exchanges.

At this point, it seemed neither necessary nor advantageous to provide supervisory signals other than those normally used in the establishment of local calls, e. g. dial tone, ringback tone, and busy tone.

Continued development of automatic systems lead to the introduction and widespread use of step by step tandem systems for short haul toll calls in areas served by several nearby automatic exchanges utilizing step by step switching equipment, in which tandem systems a call originated in one exchange could be extended (for example by a calling subscriber or by a local operator) by way of one or more intermediate exchanges to a subscriber served by a terminating exchange. Alternate routes for extending calls were often available in the tandem systems. As the automatic systems thus became more complex, additional supervisory signals became desirable for aiding an operator in the completion of calls, some of which signals will be described later.

Until recent years however, the use of automatic switching equipment controllable by a toll operator at an originating exchange, for completing long distance calls to distant step by step areas was not too common. But as the proportion of subscribers with dial service increased tremendously, it appeared advantageous to eliminate the help of the "inward" operator at the dial exchange which serves a called subscriber and to provide, at said dial exchange, automatic switching equipment controllable from the originating exchange together with means for returning supervisory signals to the originating exchange in order to aid the originating operator in the extension of a call to the dial exchange.

It appeared particularly advantageous to eliminate the help of operators at intermediate exchanges when calls are extended from an originating exchange to a terminating exchange by way of one or more intermediate exchanges. The elimination of the help of the operator at the intermediate office gave rise to the apparent necessity of providing additional supervisory signals for the originating operator.

In as much as there are often one or more alternate routes over which long distance calls may be handled, it becomes desirable to enable an originating operator to distinguish between a busy condition on the called subscriber's line (or an all trunks busy condition at some switching stage in the terminating exchange) and an all trunks busy condition in a desired group of trunks connecting intermediate exchanges or an intermediate exchange and the terminating exchange. One method commonly used is the use of stop dial supervisory equipment whereby a signal is returned to an originating operator when, after seizure of a selector having access to a group of trunks connecting an intermediate office to the desired terminating office, she dials a code for causing said selector to seize one of said trunks. Said stop dial signal is removed if the selector switches through to one of said trunks; but the stop dial signal is replaced by an all trunks busy signal if said trunks are busy. This use of the stop dial signal is merely ancillary to its intended function which is well known in the art, that is, to notify an originating operator to dial the code of a next succeeding exchange only after the already seized switching equipment is ready to receive said code. It would be sufficient merely to have a special all trunks busy signal for said interexchange trunk groups.

To go a step further, it has been deemed advantageous, especially in the processing of long distance calls, to permit an originating operator, when all trunks interconnecting intermediate exchanges or an intermediate exchange and a terminating exchange are found busy, to hold her partially extended connection until one of the trunks becomes idle at which time she may take down her connection and dial again to secure said one idle trunk. Obviously a second supervisory signal together with means for substituting it for the all trunks busy signal must be provided at the "camp-on-busy" selector switch having access to said trunks in order to give an indication to the originating operator when a trunk becomes idle. It is also desirable when several other operators are already awaiting idle trunks in a particular desired group to inform the later calling operator of the condition by means of a third supervisory signal so that she can handle her call over an alternate route (if one is available) or temporarily delay the call. For purposes herein the three supervisory signals will be referred to respectively as "all trunks busy," "circuit available" and "master busy."

It is with these three supervisory signals together with their associated control circuits that this invention is concerned.

The control circuits are associated in part with the group of trunks interconnecting, for example, an intermediate exchange and the desired terminating exchange and are also associated in part with the camp-on-busy selectors having access to said trunks. The three supervisory signals have previously been provided by equipping each of the camp-on-busy selectors with a minor switch and additional control relays and by providing a "group busy and overflow circuit" for each group of trunks served by the selectors, as shown in Bell Laboratories Record, October 1941, page 51.

It is an object of this invention to simplify the control circuits and to reduce the cost by the elimination of the minor switch and some of the above-mentioned additional relays in the thru selector.

A feature of the supervisory control circuit is the use of eleventh rotary contacts accessible to the pair of wipers of the camp-on-busy selectors over which numerical impulses are extended to succeeding switching equipment and over which a conversation circuit is established.

Another feature of the supervisory control circuit is the use in the camp-on-busy selectors of af vertical wiper and bank contacts accessible thereto.

Another feature of the supervisory control circuit is the use of the line wipers of the camp-on-busy selectors for this purpose.

Another feature of the supervisory control circuit is the use of one relay individual to a group of trunks but common to all camp-on-busy selectors having access to those trunks together with the use of the selectors' extra control wipers for extending the all trunks busy signal and the circuit available signal to the camp-on-busy selectors awaiting an idle trunk in the group.

Another feature of the supervisory control circuit is the use of the rotary magnets of the camp-on-busy selectors for controlling the circuits for giving a master busy signal when several operators are awaiting an idle trunk in a particular group.

Another feature is the forcible rotation of the wipers of a camp-on-busy selector to the eleventh rotary position if, when the rotary motion is started, all trunks in the desired group are busy, even though a trunk may thereafter become idle.

Additional objects and features will be evident upon a perusal of the following description in which.

This case discloses improved supervisory equipment for use in systems wherein calls may be extended by an operator at an originating exchange to a terminating exchange by way of an intermediate exchange without the help of an operator at the intermediate exchange. The supervisory equipment is associated with the desired group of trunks interconnecting the intermediate and terminating exchanges and is also associated with the camp-on-busy selectors having access to said group of trunks. The use of this supervisory equipment is especially advantageous for processing long distance calls but it is not restricted thereto.

Figure 1:
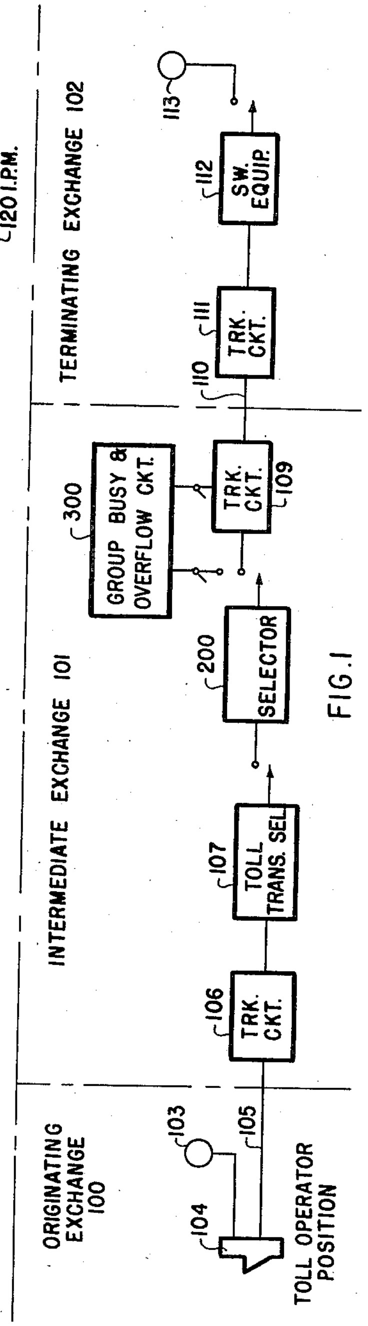
Fig. 1 shows in block diagram a system for extending a long distance call by way of an intermediate exchange.

With particular reference to Fig. 1, if an operater at the toll operator position 104 of the originating exchange 100 wishes to extend connections to a subscriber's subset such as 113 at the distant exchange 102, she will seize the toll trunk circuit 106 and the selector 107 of the intermediate exchange 101 by way of the toll line 105 in a manner well known in the art. She will then send pulses corresponding to the code designation for the terminating exchange 102. Selector 107 will seize a selector such as selector 200 which latter selector will in turn seize a toll line such as 110 by way of its associated toll trunk circuit if any of the group of toll lines interconnecting exchanges 101 and 102 are idle.

However if all of said last-mentioned lines are busy, a group busy and overflow circuit such as 300 will cause a signal to be returned to the operator to notify her of the condition. When one of said lines subsequently become idle, a second signal is returned to the operator so that she may release the connection and again dial the code designation of exchange 102. Upon the seizure of switching equipment such as 112 of exchange 102, the operator may then send impulses corresponding to the directory number of subscriber 113 to switching equipment 112, which equipment will then extend connections to subset 113 in a manner well known in the art.

Provision is also made in the group busy and overflow circuits such as 300 for returning a third signal to the operator if, when all trunks interconnecting exchanges 101 and 102 are busy, a predetermined number of other calls are waiting for an idle one of said trunks.

It will be noted that the selector 200, shown herein, can be controlled over a system similar to that shown in Patent No. 2,273,139, issued to S. E. Peterson et al. February 17, 1942.

*Detailed description—operation of selector 200*

With reference to Fig. 1, assume that an operator at position 104 has seized the camp-on-busy selector 200 by way of the toll line 105, the toll trunk circuit 106 and the toll transmission selector 107 in a manner well known in the art.

Figure 2:
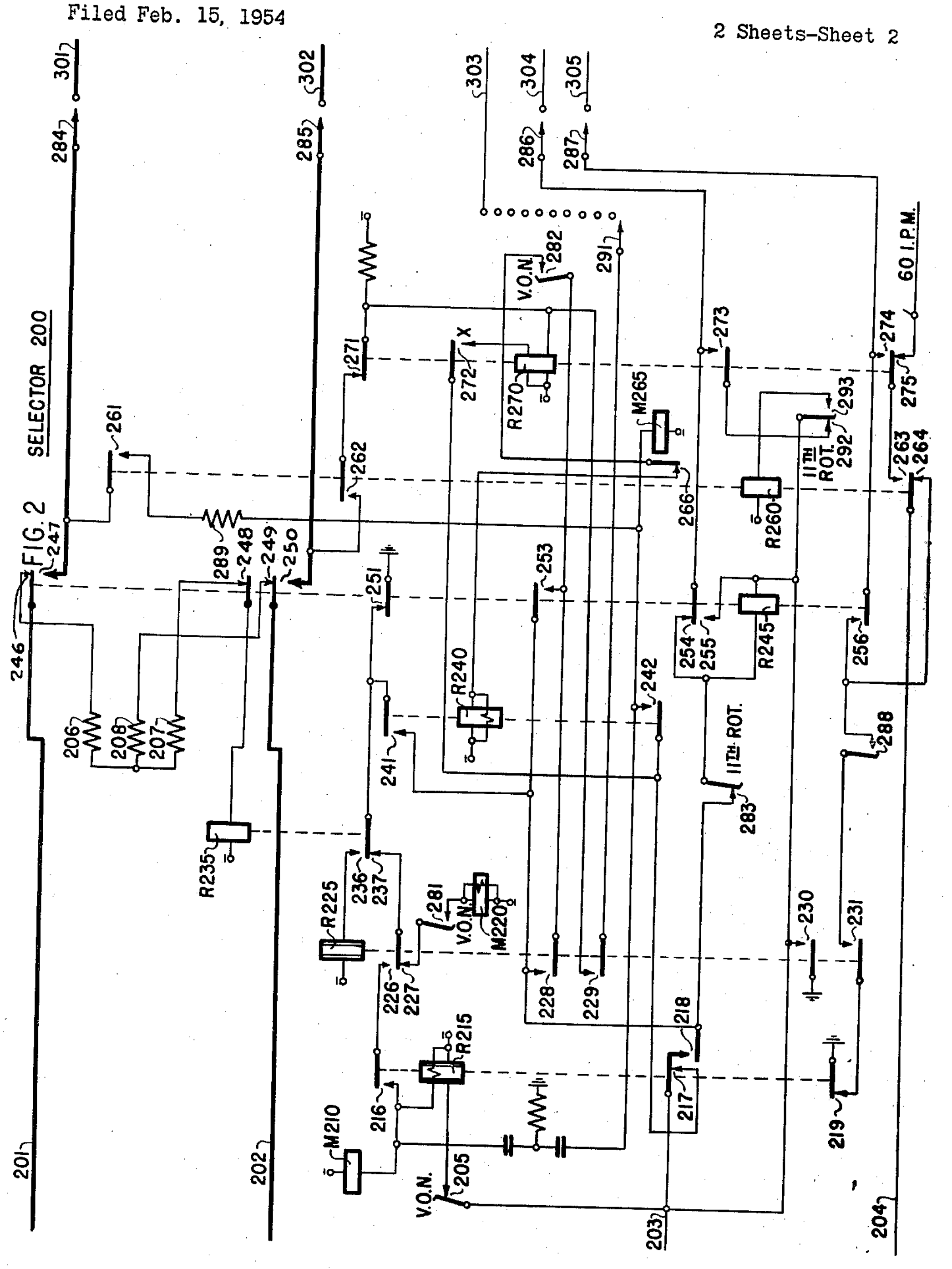
Fig. 2 shows a camp-on-busy selector switch for use in said intermediate exchange; and, Fig. 3 shows a busy and overflow circuit individual to a group of trunks connected to one level of said selector.

With particular reference to Fig. 2, the changeover relay R215 will be operated upon seizure of the selector 200 as a result of ground potential being extended from selector 107 to conductor 203 in a manner well known in the art, said ground potential being further extended through the vertical off-normal springs 205 and the lower winding of R215 to battery. When R215 operates, it closes contacts 216 to prepare an operating circuit for the vertical magnet M210 and to prepare a holding circuit for itself and closes contacts 218 to prepare a circuit for operating the interrupter relay R240.

Also upon the seizure of selector 200, a simplex signalling circuit of a type well known in the art is extended from selector 107 to the conductors 201 and 202 of selector 200 to complete a circuit for operating the line relay R235, said circuit extending from grounded conductor 201 through contacts 246, resistance elements 206 and 207, contacts 248 and the winding of R235 to battery and from grounded conductor 202 through contacts 249, resistance elements 208 and 207, contacts 248 and the winding R235 to battery. R235 operates, closes contacts 236 to complete an obvious circuit for operating the hold relay R225. R225 operates; at contacts 226, further prepares the operating circuit for the vertical magnet M210 and the holding circuit for changeover relay R215; at contacts 228, further prepares an operating circuit for the interrupter relay R240; at contacts 230, places a busy ground potential on the private conductor 203; and at contacts 231, prepares a circuit for returning a stop dial signal to the originating operator. Selector 200 is now ready to receive the series of impulses for selecting an idle one of the outgoing trunks interconnecting exchanges 101 and 102.

When the first impulse of said series is received and repeated by the toll transmission selector 107 in a manner well known in the art, the line relay R235 deenergizes and closes contacts 237 to energize the vertical magnet M210 over an obvious circuit. The selector wipers are stepped to the first vertical level, and the vertical off-normal contacts 205 are opened to open the original operating circuit for the changeover relay R215. The vertical off-normal contacts 281 are closed to prepare a circuit for operating the release magnet M220; the vertical off-normal contacts 282 close to complete a circuit for operating the interrupter relay R240, said circuit extending from ground over contacts 230, 218, 228, 282 and 266 through the winding of R240 to battery. At contacts 241, R240 completes a circuit for maintaining itself operated, said circuit extending from ground through contacts 251, 241, 228, 282 and 266 and through the winding of R240 to battery. At contacts 242, R240 prepares a circuit for the rotary magnet M265. The changeover relay R215 is maintained operated over a holding circuit extending from ground through contacts 251, 237, 226 and 216 through the upper winding of R215 to battery. Since R215 is slow to release it will be held operated when contacts 237 cyclically open and close during the receipt of said series of impulses.

At the end of said first impulse the line relay R235 will reoperate, open contacts 237 and reclose contacts 236. The vertical magnet M210 will restore. In response to each subsequent impulse in the series of impulses, which we will assume to be 10, the vertical magnet will be operated to raise the wipers one step, the wipers reaching the tenth level at the end of said series of impulses.

Soon after the termination of said series of impulses, the changeover relay R215 will deenergize, at contacts 219 prepares a circuit for returning a stop dial signal to the originating operator, and at contacts 217 completes a circuit for operating the rotary magnet M265, said circuit extending from ground through contacts 230, 217 and 242 and through the winding of M265 to battery. M265 operates, steps the wipers to the first bank contacts accessible thereto, and at contacts 266 opens the previously mentioned operating and holding circuits for R240. R240 deenergizes; at contacts 241, opens another point in its holding circuit; and at contacts 242 opens the previously mentioned operating circuit for M265. M265 restores.

The thru selector 200 is of the type well known in the art which searches for absence of ground. When M265 restores to close contacts 266, a circuit is completed for operating the switch through relay R245 in series with the interrupter relay R240, said circuit extending from battery through the winding of R240, contacts 266, 282, 228 and 283 through the winding of R245 to ground at contacts 230. R245 is a high resistance relay and the interrupter relay R240 will not operate in series with R245 in this circuit. A branch of this circuit extends through contacts 254 to wiper 286. If wiper 286 encounters a ground potential on the bank contact (which ground potential indicates a busy condition of the toll trunk connected to the first bank contacts), R245 will be short circuited and the interrupter relay R240 will be operated. If R240 operates due to wiper 286 encountering ground potential, it will close contacts 242 to cause the rotary magnet M265 to reoperate to step the wipers to the second bank contacts in the tenth level. In a manner previously described M265 will open contacts 266 to restore R240. R240 and M265 will be cyclically operated in this manner until an idle toll trunk is encountered. When an idle toll trunk is encountered, the switch through relay R245 will be operated as previously described; and, at contacts 247 and 250, will extend the simplex signalling circuit to the idle toll trunk by way of wipers 284 and 285; at contacts 251, will open the operating circuit of the hold relay R225, said relay restoring after a predetermined interval; at contacts 253, R245 will complete a circuit for maintaining itself operated after the hold relay subsequently restores to open the original operating circuit of R245, said circuit extending from ground on conductor 203, through R245, contacts 283, 253, 282 and 266, and R240 to battery; at contacts 255, will extend ground from the private conductor 203 to a private conductor associated with said toll trunk by way of the private wiper 286 and also prevent the short circuiting of R245, thereby to maintain R245 operated over its previously described circuit; at contacts 246 and 249, R245 will restore the line relay R235; and, at contacts 256, will connect the incoming extra control conductor 204 to the outgoing extra control wiper 287 by way of contacts 264 and 256.

At this point it is to be noted that when the wipers took their first rotary step the normal post springs closed contacts 288 to extend ground over contacts 219, 231, 288 and 264 to the extra control conductor 204 for the purpose of returning a stop dial signal to the originating operator in a manner well known in the art. When R225 restores as previously described, to indicate that selector 200 has switched through to an idle toll trunk interconnecting exchanges 101 and 102, it opens contacts 231 to remove the stop dial signal and it removes a multiple ground from the private conductor 203 at contacts 230.

*The group busy and overflow circuit 300*

Figure 3:
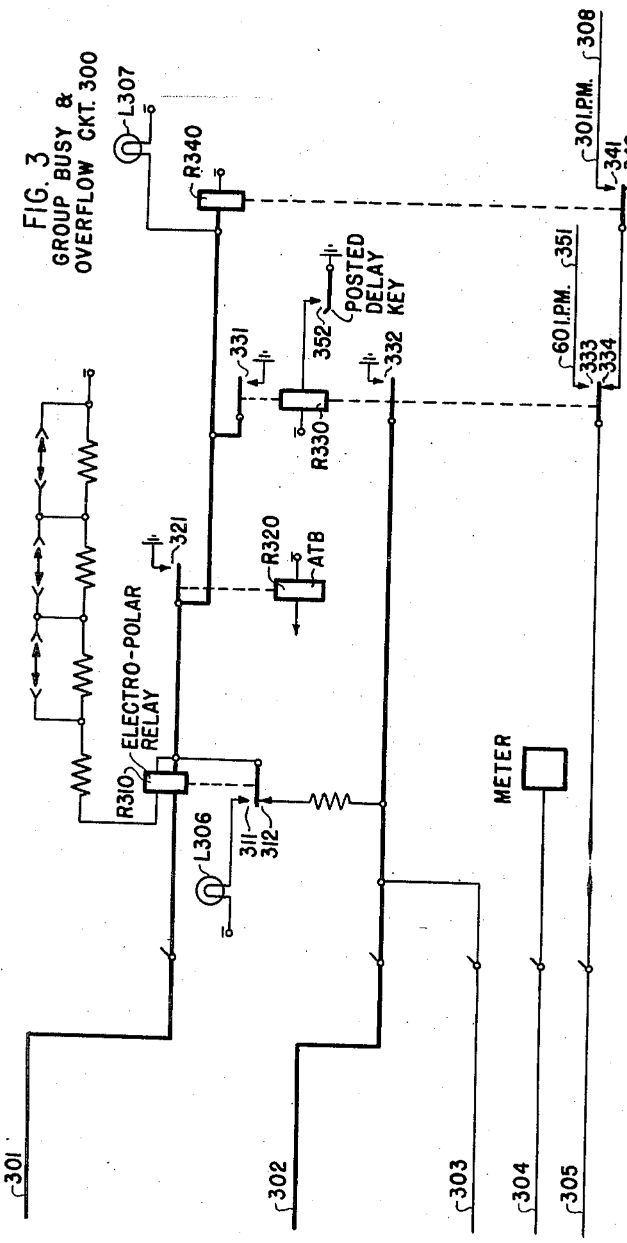

A group busy and overflow circuit such as circuit 300, Fig. 3, is associated with each group of outgoing toll lines accessible to the selector 200 (and accessible to other selectors in the same shelf). Circuit 300, as shown, is associated with the group of toll lines connected to the tenth level of selector 200. Conductors 301, 302, 304 and 305 are multipled to the eleventh rotary bank contacts in levels of all selectors to which said associated group of toll lines is connected; and conductor 303 is multipled to the vertical bank contacts in said last-mentioned levels.

An all trunks busy relay R320, is normally maintained operated over a circuit not shown in a manner well known in the art. When all toll lines in the group are busy, R320 restores, extends ground potential from contacts 321 to conductors 302 and 303 over an obvious circuit, operates a signal control relay R340 over an obvious circuit, completes an obvious circuit for energizing but not operating the electro-polar traffic congestion relay R310 over its upper polarizing winding, prepares a circuit for operating the polar relay R310 over its lower winding, and lights lamp L307.

The upper and lower windings of the polar relay R310 are differentially wound and therefore give rise to magnetic fields of opposite polarity. Also the current flow through the upper polar winding generates a magnetic field which tends to hold the armature against the back contact to maintain contacts 312 closed while the magnetic field generated by the lower operating winding tends to operate the armature in opposition to the polar winding to close contacts 311. Therefore, in order to operate its armature, the current passing through the lower winding of R310 must generate sufficient flux to overcome the flux generated by the upper winding in addition to the flux normally required to operate the armature if the upper winding were not energized. It is apparent therefore that the amount of current necessary to operate R310 over its lower winding will depend partially upon the current flow through its upper winding. The current flow through the upper winding may be increased by short-circuiting one or more of the resistance elements connected in series with the upper winding by means of the optional wiring shown with said elements. One circuit for energizing the lower operating winding of R310 is completed when the selector 200 steps its wipers to the eleventh rotary bank contacts in its tenth level, said circuit extending from battery through the winding of the rotary magnet M265, resistance element 289, contacts 261 of relay R260 (which operates when the wipers step to the eleventh rotary—overflow—position of the switch), wiper 284, conductor 301 and the lower winding of R310 to ground at contacts 321. Similar branches of said circuit are completed by other selectors having access to the group of toll lines associated with the overflow circuit 300, when they step their wipers to their eleventh rotary bank contacts in the level to which said toll lines are connected. As the number of completed branches of said circuit for the lower winding of R310 increases, the current flow through the lower winding of R310 increases.

For purposes herein, it will be assumed, that the characteristics of the resistance elements connected in series with the upper winding of R310, of the resistance elements corresponding to element 289, and of the rotary magnets corresponding to M265 have been fixed such that, when three of the resistance elements connected to the upper winding of R310 have been shorted, four branches of the circuit for the lower winding of R310 must be completed to operate R310; when two of the resistance elements connected to the upper winding have been shorted, three branches of the circuit for the lower winding must be completed to operate R310; when one of said resistance elements has been shorted, two branches of the circuit for the lower winding must be completed to operate R310; and, when none of said resistance elements have been shorted, one branch of the circuit for the lower winding must be completed to operate R310.

In view of the foregoing, it is apparent that, when a predetermining number of thru selectors have been operated to positions in which their wipers, corresponding to wiper 284 of selector 200, are in engagement with bank contacts to which conductor 301 is connected (indicating that they are awaiting an idle line in the group of toll lines associated wtih circuit 300), the polar relay R310 will operate.

When the relay R310 operates, it lights the lamp L306 over an obvious circuit; and, at contacts 312, opens the previously mentioned circuit whereby the all trunks busy relay R320 extended ground potential to conductors 302 and 303.

*All trunks busy condition when selector 200 is opterated to a busy level*

Assuming now that, when the vertical magnet steps the wipers to the tenth level (as described above), all of the trunks connected to said level are busy. The all trunks busy relay R320 will have been restored; the signal control relay R340 will have been operated; and ground potential will be encountered by the vertical wiper 291 when it engages the contact to which conductor 303 is connected. Said ground potential will be extended from wiper 291, through contacts 229 and the lower winding of relay R270 to battery. Relay R270 operates; at contacts 202, prepares a locking circuit for itself; at contacts 273, extends ground potential over contacts 230, 292, 273 and 254 to the winding of the switch through relay R245 to prevent its operation; and, at contacts 274, prepares a circuit for returning an all trunks busy signal to the originating operator. Shortly after the operation of R270, the seize relay R215 restores (as previously described) and closes contacts 217 to complete a circuit for maintaining R270 operated, said circuit extending from ground over contacts 230, 217 and 272, through the upper winding of R270 to battery. Since R270 has short circuited R245 to prevent its operation, the interrupter relay R240 and the rotary magnet will be cyclically operated (over circuits previously described) to rotate the wipers to the overflow position, in which position the cam springs operate contacts 283, 292 and 293. At contacts 283, the previously described circuit for operating R245 is opened; and, at contacts 293, an obvious circuit is completed for operating relay R260. Also ground potential is extended over contacts 230, the winding of R245, contacts 254, wiper 286 and conductor 304 to a high resistance meter, which meter is operated in a manner well known in the art to record the number of times an all trunks busy condition is encountered by selectors searching for a toll line in the group associated with circuit 300. R245 will not operate in the above described circuit for the meter.

At contacts 261, R260 completes one branch of the circuit for operating the polar relay R310, said branch extending from battery, through the rotary magnet M265, resistance element 289, contacts 261, wiper 284, conductor 301, and the lower operating winding of R310 to ground; and, at contacts 263, extends a 30 impulse per minute signal from signalling equipment (not shown), over conductor 308 (Fig. 3), contacts 341 and 334, conductor 305, wiper 287, contacts 274 and 263 to conductor 204 whence it will be returned to the originating operator in a manner well known in the art.

When a toll line in the group connected to the tenth level of selector 200 becomes idle, the all trunks busy relay R320 will reoperate and restore the signal control relay R340. At contacts 341 and 342, R340 will remove the 30 impulse per minute signal from conductor 204 and substitute the 120 impulse per minute circuit available signal, which latter signal will be returned to the originating operator in a manner described with respect to the 30 impulse per minute busy signal. The operator will take down her connection to release the toll line circuit 106 and the toll transmission selector 107, which circuit and selector restore to normal in a manner well known in the art, and to release the selector 200 (which will be described later). Then the operator will replace the connection and again dial the code corresponding to the terminating exchange 102 in order to seize the idle toll line. Thereafter, she will complete the call in a manner well known in the art.

*All trunks busy condition after selector 200 starts the rotary stepping of the wipers*

Assume that all of the toll lines connected to the tenth level contacts of selector 200 become busy after the interrupter relay R240 and the rotary magnet M265 begin to step the wipers in the rotary direction in the tenth level (as described above). Once the selector has stepped off normal in the rotary direction, the vertical wiper 291 moves out of engagement with the vertical bank contact of the tenth level; and, as a result, a subsequent all trunks busy condition cannot operate relay R270 over the previously described circuit which included said wiper and contact.

Since all lines are busy the wipers will be stepped to the eleventh rotary position, in which position relay R260 will be operated over a circuit described previously. At contacts 262, R260 will complete a circuit for operating relay R270, said circuit extending from ground over contacts 321 (of the restored all trunks busy relay R320) and 312, conductor 302, wiper 285, contacts 262 and 271, through the lower winding of R270 to battery. R270 locks itself operated over a circuit previously described and the 30 impulse per minute busy signal is returned to the operator in a manner previously described.

*Returning master busy signal incident to overflow condition*

Assume that the polar relay R310 is conditioned to operate when four operators are awaiting an idle one of the toll lines associated with the group busy and overflow circuit 300—i. e. three of the resistance elements connected in series with the upper winding of R310 are short circuited by the three optional straps shown therewith.

Assume further that, when a fifth operator causes selector 200 to be seized, four other operators have extended connections to the group busy and overflow circuit 300 by way of selectors similar to selector 200 and that said four selectors have connected battery by way of their rotary magnets—corresponding to magnet M265—to conductor 301 to cause the polar relay R310 to operate over its lower winding.

When R310 operated, it opened contacts 312 to remove ground potential from conductors 302 and 303.

When the wipers of selector 200 are stepped to the tenth level in a manner previously described, relay R270 will not operate because ground has been removed from conductor 303. Since all of the lines connected to the tenth level of selector 200 are busy, the interrupter relay R240 and the rotary magnet M265 will cause the wipers to rotate to the overflow position in a manner previously described and relay R260 will operate in said overflow position as described above. Again relay R270 canont operate because ground has also been removed from conductor 302. As a result of the inability of R270 to operate, a master busy signal of 60 impulses per minute, interrupted at predetermined intervals to clearly distinguish it from 30 and 120 impulse per minute signals, is placed upon conductor 204 by way of contacts 275 and 263, from which conductor the signal is returned to the originating operator in a manner well known in the art.

*Master busy signal incident to a posted delay condition*

Assume that an attendant at the intermediate exchange 101 has operated the posted delay key to close contacts 352 thereby to operate relay R330.

At contacts 332, R330 places ground potential upon conductors 302 and 303, which ground potential is not removed even if the overflow relay R310 is operated; at contacts 333, R330 extends the 60 impulse per minute master busy signal from signal equipment (not shown) to conductor 305 by way of conductor 351; and, at contacts 331, lights the lamp L307.

If, while the posted delay relay R330 is operated, the selector 200 is stepped to the tenth level in search of a toll line interconnecting exchanges 101 and 102, relay R270 will be operated over a circuit extending from ground over contacts 332, conductor 303, the vertical wiper 291, contacts 229, through the lower winding of R270 to battery. R270 will lock itself operated over a circuit previously described. The interrupter relay R240 and the rotary magnet M265 cyclically operate to cause the wipers to rotate to the overflow position, in which position R260 operates all in a manner previously described.

With relays R260 and R270 operated, the master busy signal placed on conductor 305, as described above, is extended by way of contacts 274 and 263 to conductor 204 whence it is returned to the originating operator in a manner well known in the art.

*Release of selector 200*

Subsequent to its operation, selector 200 will be restored by the release magnet M220 under the control of the originating operator. M220 will operate only when the line relay R235, the hold relay R225 and the switching relay R245 are all in a restored condition over a circuit extending from ground over contacts 251, 237, 227 and 281, through the winding of M220 to battery.

When selector 200 has extended connections through to one of the outlets accessible thereto, only the switching relay R245 will be operated (as previously described). When the originating operator takes down her connections, ground potential will be removed from the private conductor 203 and relay R245 will restore. The release magnet M220 will operate over the above described circuit to restore switch 200 to normal in a manner well known in the art.

When the wipers of selector 200 have been stepped to an overflow position due to an all trunks busy condition or due to a posted delay condition, relays R225, R235, R260 and possibly R270 will be operated. When the operator takes down her connection, ground will be removed from the private conductor 203 to open one circuit for holding R260 operated; the simpled signalling circuit will be opened to restore the line relay R235; R235 will restore to open the operating circuit of the hold relay R225; and R225, upon restoring, will restore relay R260 and relay R270, if it is operated, and further will complete the above described circuit for operating the release magnet M220.

While there has been described what is at present considered to be the preferred embodiment of the invention, it will be understood that various modifications may be made therein; and it is contemplated to cover in the appended claims all such modifications as fall within the true spirit and scope of the invention.

What is claimed is:

1. For use in a telephone system, a numerical switch of the trunk hunting type having incoming connections including a pair of conductors over which numerical impulses are received and over which a conversation circuit is established and including a supervisory signal conductor, and having a supervisory signal wiper and a pair of wipers over which numerical impulses are extended and over which the conversation circuit is established together with contact banks accessible to the wipers, groups of trunks connected to said bank contacts, one of said groups being connected to the bank contacts in certain positions of the switch, means in the switch controlled by said impulses received over said conversation conductors for selectively moving the wipers into an intermediate position preceding said certain positions, means for thereafter automatically advancing the wipers over said certain positions, means for individually testing the trunks of said one group for their idle condition during said advancement and for arresting said advancement when an idle trunk is encountered, means operated incident to said testing means encountering an idle trunk for connecting said conversation and supervisory conductors to said idle trunk by way of said conversation and supervisory wipers, said wipers being advanced to an overflow position following said certain positions in case said testing means finds all trunks in said one group busy, a first relay in the switch, means for operating said relay incident to the wipers moving into said overflow position, a group busy and overflow circuit connected to the bank contacts in said overflow position, means in the group busy and overflow circuit controlled incident to the existence of an all trunks busy condition in said one group of trunks for extending a marking potential to a bank contact accessible to one of the conversation wipers in the overflow position, a second relay in the switch, a first circuit means including said marking potential and said one conversation wiper controlled by the operation of the first relay for operating the second relay, contact means in the switch connected to said group busy and overflow circuit and closed in said intermediate position, said sixth means also extending said marking potential to said contact means when all trunks in said group are busy, a second circuit means including said marking potential and said contact means for operating said second relay if all trunks are busy while the wipers are in said intermediate position, circuit means controlled by the operation of said second relay over said second circuit means for preventing the testing means from arresting said automatic advancement, thereby to force the wipers into the overflow position even though trunks in said group may become idle, a signal lead in the group busy and overflow circuit, means controlled by the operation of said two relays for extending said supervisory conductor to said signal lead by way of the supervisory wiper, and means in the group busy and overflow circuit controlled by the existence or non-existence of an all trunks busy condition in said one group of trunks for placing upon said signal lead signal indications corresponding to the existence or non-existence of said condition.

2. For use in a telephone system, a numerical switch of the trunk hunting type having incoming connections including a pair of conductors over which numerical impulses are received and over which a conversation circuit is established and including a supervisory signal conductor, and said switch having a supervisory signal wiper and a pair of wipers over which numerical impulses are extended and over which the conversation circuit is established together with contact banks accessible to the wipers, groups of trunks connected to said bank contacts, one of said groups being connected to the bank contacts in certain positions of the switch, means in the switch controlled by said impulses received over said conversation conductors for selectively moving the wipers into an intermediate position preceding said certain positions, means for thereafter automatically advancing the wipers over said certain positions, means for individually testing the trunks of said one group for their idle condition during said advancement and for arresting said advancement when an idle trunk is encountered, means operated incident to said testing means encountering an idle trunk for connecting said conversation and supervisory conductors to said idle trunk by way of said conversation and supervisory wipers, said wipers being advanced to an overflow position following said certain positions in case said testing means finds all trunks in said one group busy, a first relay in the switch, means for operating said relay incident to the wipers moving into said overflow position, a group busy and overflow circuit connected to the bank contacts in said overflow position, manually operable means associated with said group busy and overflow circuit and actuated upon the existence of a predetermined condition or conditions of heavy traffic in said group for extending a marking potential to a bank contact accessible to one of the conversation wipers in the overflow position, a second relay in the switch, a first circuit means including said marking potential and said one conversation wiper controlled by the operation of the first relay for operating the second relay, contact means in the switch connected to said group busy and overflow circuit and closed in said intermediate position, said manually operated means also extending said marking potential to said contact means, a second circuit means including said marking potential and said contact means for operating said second relay if said manually operated means is actuated while the wipers are in said intermediate position, circuit means controlled by the operation of said second relay over said second circuit means for preventing the testing means from arresting said automatic advancement, thereby to force the wipers into the overflow position even though trunks in said group may be idle, a signal lead in the group busy and overflow circuit, means controlled by the operation of said two relays for extending said supervisory conductor to said signal lead by way of the supervisory wiper, and means in the group busy and overflow circuit controlled by said manually operable means for placing a master busy signal upon said signal lead.

3. In a telephone system, a plurality of numerical switches of the camp-on-busy type, each having incoming connections including a pair of conductors over which numerical impulses are received and over which a conversation circuit is established and including a supervisory signal conductor and each switch having a supervisory wiper and a pair of wipers over which numerical impulses are extended and over which the conversation circuit is established together with contact banks accessible to the wipers, a group of trunks accessible in common to the switches and connected in multiple to their bank contacts in certain positions of the switches, means in each switch controlled by said impulses received over its respective conversation conductors for selectively moving its respective wipers into an intermediate position preceding its certain positions to which said group of trunks are connected, means for thereafter automatically advancing said respective wipers over said certain positions, means in each switch for individually testing the trunks of said group for their idle condition during said advancement and for arresting said advancement when an idle trunk is encountered, means in each switch operated incident to its testing means encountering an idle trunk for connecting its conversation and supervisory conductors to said idle trunk by way of its conversation and supervisory wipers, the wipers in each switch being advanced to an overflow position following its respective certain positions in case that all of said trunks are busy, a group busy and overflow circuit connected to bank contacts of each switch in its respective overflow position, a polarized relay in the group busy and overflow circuit, a first circuit including a resistance element of a predetermined value for energizing said relay in one manner incident to the existence of an all trunks busy condition in said group of trunks, a second circuit for controlling the energization of said relay in another manner, means in each switch for connecting a marking potential to said second circuit by way of a resistance element of a predetermined value and one of the conversation wipers incident to the wipers moving into the overflow position, said relay being polarized so as to operate only over said second circuit when a predetermined number of said switches concurrently extend said marking potential to said second circuit, and means in each switch effective if the switch wipers are moved into the overflow position subsequent to the operation of said relay for extending a master busy signal to its incoming supervisory conductor.

4. In a telephone system, a plurality of numerical switches of the camp-on-busy type, each having incoming connections including a pair of conductors over which numerical impulses are received and over which a conversation circuit is established and including a supervisory signal conductor and each switch having a supervisory wiper and a pair of wipers over which numerical impulses are extended and over which the conversation circuit is established together with contact banks accessible to the wipers, a group of trunks accessible in common to the switches and connected to their bank contacts in certain positions of the switches, means in each switch controlled by said impulses received over its respective conversation conductors for selectively moving its respective wipers into an intermediate position preceding its certain positions to which said group of trunks are connected, means for thereafter automatically advancing said respective wipers over said certain positions, means in each switch for individually testing the trunks of said group for their idle condition during said advancement and for arresting said advancement when an idle trunk is encountered, means in each switch operated incident to its testing means encountering an idle trunk for connecting its conversation and supervisory conductors to said idle trunk by way of its conversation and supervisory wipers, the wipers in each switch being advanced to an overflow position following its respective certain positions in case that all of said trunks are busy, a first relay in each switch, means for operating each first relay incident to the wipers of the respective switch moving into the respective overflow position, a group busy and overflow circuit connected to bank contacts in each switch in the overflow positions, means in the group busy and overflow circuit controlled incident to the existence of an all trunks busy condition in said group of trunks for extending a marking potential to overflow bank contacts accessible to one of the conversation wipers in each of the switches, a second relay in each switch, a first circuit including said marking potential and the respective one conversation wiper and controlled by the operation of the respective first relay for operating the respective second relay, contact means in each switch connected to said group busy overflow circuit and closed in the respective intermediate position, said sixth means also extending said marking potential to each contact means, a second circuit including said marking potential and the respective contact means for operating the respective second relay if all trunks are busy when the respective wipers are moved into their intermediate position, circuit means controlled by the operation of a second relay over its second circuit for preventing the respective testing means from arresting said automatic advancement, thereby to force the wipers into the overflow position even though trunks in said group may become idle, a signal lead in the group busy and overflow circuit, means in each switch controlled by the operation of both of its relays for extending its supervisory conductor to said signal lead by way of its supervisory wiper, means in the group busy and overflow circuit controlled by the existence or non-existence of an all trunks busy condition in said one group for placing upon said signal lead signal indications corresponding to the existence or non-existence of said condition, a polarized relay in the group busy and overflow circuit, a circuit including a resistance element of a predetermined value for energizing said relay in one manner incident to the existence of an all trunks busy condition in said group of trunks, a circuit for controlling the energization of said relay in another manner, means in each switch for connecting a marking potential to the latter circuit by way of a resistance element of a predetermined value and one of its conversation wipers incident to the wipers moving into the overflow position, said relay being polarized so as to operate only over the latter circuit when a predetermined number of said switches concurrently extend said marking potential thereto, means controlled upon the operation of said polarized relay for thereafter preventing the operation of said second relays in switches searching for a trunk in said one group, and means in each switch controlled by the operation of only its first relay when its testing means find all trunks in the group busy for extending a master busy signal to its incoming supervisory conductor.

5. In a telephone system, a plurality of numerical switches, each having an incoming supervisory conductor, a pair of incoming talking conductors, a supervisory wiper and a pair of talking wipers and contact banks for its wipers, a group of trunk lines accessible in common to said switches, means in each switch controlled upon the receipt of a certain series of impulses over its talking conductors for advancing its wipers to an idle line in said group and for extending connections to said idle line by way of its incoming conductors and its wipers and for advancing its wipers over said lines to an overflow position for camping purposes in case all of said lines are busy, a switching means connected to the overflow positions of the switches, means in each switch for applying an electric marking increment to said switching means by way of one of its talking wipers and the bank contact accessible to said wiper in the overflow position, said switching means being operated responsive to a predetermined number of said marking increments being concurrently applied thereto, means in each switch controlled by said switching means for connecting a supervisory signal to its incoming supervisory conductor in case said switch is advanced to its overflow position subsequent to the operation of said switching means.

6. For use in a telephone system, a numerical switch of the trunk hunting type having a pair of incoming talking conductors and an incoming supervisory conductor, a pair of talking wipers and a supervisory wiper and bank contacts accessible to the wipers, a group of trunks connected to said bank contacts in certain positions of the switch, means operated by the series of impulses received over said talking conductors for moving the wipers into a test position preceding said certain positions, means thereafter operated and effective for automatically advancing the wipers to an idle trunk and for extending connections to said idle trunk by way of said incoming conductors and said wipers and for advancing the wipers into an overflow position following said certain positions if all of said trunks are busy, contact means in the switch closed in said test position, a control circuit connected to the overflow bank contacts, means in the control circuit operated upon the existence of a predetermined condition or conditions of traffic in said group of trunks, means in the switch for connecting a signal corresponding to said condition or conditions of traffic to said supervisory conductor, means controlled by said control circuit means when operated for operating said connecting means over a circuit including one of the talking wipers when the wipers are in the overflow position and by way of a circuit including said contact means when the wipers are in the test position, and means in the switch operated and effective when said connecting means is operated when the wipers are in the test position for forcing the wipers into the overflow position even though some of said trunks may be idle.

7. In a telephone system, a plurality of numerical switches each having a pair of incoming talking conductors and an incoming supervisory conductor, a pair of talking wipers and a supervisory wiper and contact banks for the wipers, a group of trunk lines connected to bank contacts in certain positions of said switches, means in each switch operated by a series of impulses received over its talking conductors for advancing its wipers to a test position preceding its certain positions, means thereafter operated and effective for automatically advancing the wipers to an idle trunk and for extending connections to said idle trunk by way of said incoming conductors and said wipers when one of said trunk lines is idle, and for advancing the wipers to an overflow position following said certain positions when all of the trunk lines are busy, contact means in each switch closed in its test position, means in each switch for connecting a signal corresponding to a predetermined condition of traffic to its incoming supervisory conductor, control means connected to the overflow positions of said switches and operated incident to the existence of said predetermined condition of traffic, said last means when operated causing the operation of said connecting means over a circuit including one of the talking wipers in the overflow position and over another circuit including said contact means when the wipers are in the test position to connect said signal to said supervisory conductor.

8. In a telephone system, a plurality of numerical switches, each having a pair of incoming talking conductors and an incoming supervisory conductor, a pair of talking wipers and a supervisory wiper and contact banks accessible to the wipers, a group of trunks accessible in common to said switches, means in each switch controlled upon the receipt of a certain series of impulses over its talking conductors for advancing its wipers to an idle trunk in said group and for extending connections to said idle trunk by way of its incoming conductors and its wipers, and for advancing its wipers over said lines to an overflow position if all of said trunks are busy, a relay connected to the overflow positions of said switches, means in each switch for applying a marking potential to said relay by way of one of its talking wipers and the bank contact accessible to the wiper in the overflow position, said relay operated responsive to a predetermined number of said marking potentials being concurrently applied thereto, means in each switch operated by said relay in its restored condition when all trunks in the group are busy for connecting one signal to its supervisory conductor and remaining unoperated when said relay is in its operated condition and all of said trunks are busy for connecting a second signal to said supervisory conductor.

References Cited in the file of this patent

UNITED STATES PATENTS

| | | |
|---|---|---|
| 1,509,298 | Jacobsen | Sept. 23, 1924 |
| 2,097,165 | Stokely | Oct. 26, 1937 |
| 2,151,767 | Houland | Mar. 28, 1939 |
| 2,273,139 | Petersen et al. | Feb. 17, 1942 |